June 24, 1930.  F. C. YATES  1,767,107
BALL RETAINER FOR ANTIFRICTION BEARINGS
Filed May 16, 1927
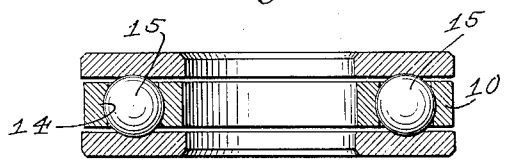
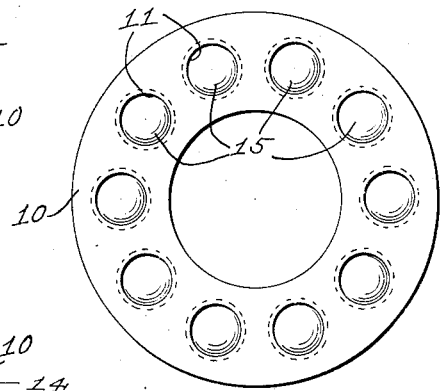
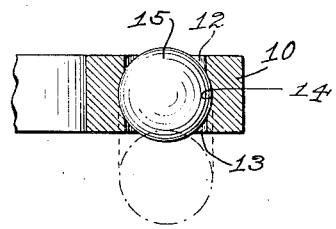
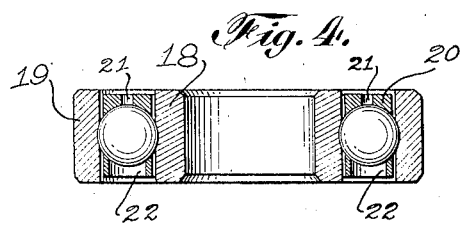
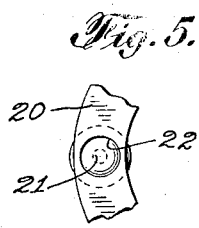
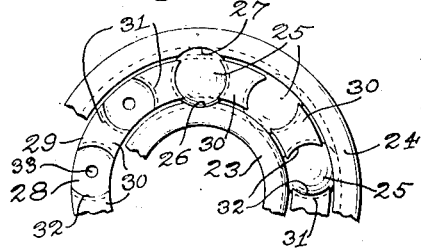
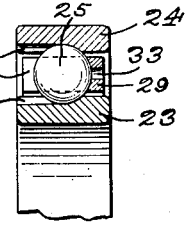
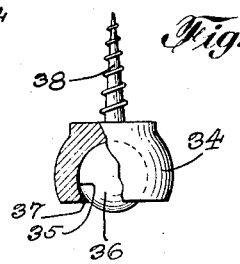
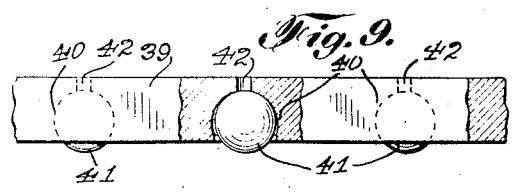
INVENTOR
Frederick C. Yates
BY
H. G. Manning
ATTORNEY Patented June 24, 1930

1,767,107

UNITED STATES PATENT OFFICE

FREDERICK CHARLES YATES, OF NEW YORK, N. Y.

BALL RETAINER FOR ANTIFRICTION BEARINGS

Application filed May 16, 1927. Serial No. 191,679.

This invention relates to anti-friction bearings, and more particularly to an improved form of ball retainer for thrust or radial bearings.

One object of this invention is to provide a ball retainer of the above nature constructed of yieldable material having sockets into which the balls are adapted to be forcibly driven and in which they are removably retained.

A further object is to provide a yieldable ball retainer of the above nature having ball-holding sockets, the openings of which are of slightly smaller diameter than the balls themselves, said openings being caused to expand and then contract to their original size when the balls are driven into position.

A further object is to provide a ball retainer of the above nature which will be simple in construction, inexpensive to manufacture, easy to install and manipulate, compact, and very efficient and durable in use.

With these and other objects in view there have been illustrated on the accompanying drawing several forms in which the invention may be conveniently embodied in practice.

Fig. 1 is a sectional view of a thrust bearing embodying the principles of the invention and showing the upper and lower thrust plates assembled in operating position.

Fig. 2 is a top plan view of the same with the upper thrust plate removed for clearness.

Fig. 3 is a fragmentary sectional view on an enlarged scale of the thrust bearing retainer shown in Figs. 1 and 2, and illustrating by dotted lines how the ball may be driven into operating position.

Fig. 4 is a sectional view of a radial bearing also embodying the invention, and showing the inner and outer collars assembled in operating position.

Fig. 5 is a fragmentary bottom view of the same.

Fig. 6 is a fragmentary top plan view of a slightly modified form of radial bearing also embodying the invention.

Fig. 7 is a fragmentary sectional view of the radial bearing shown in Fig. 6.

Fig. 8 is a side view, partly in section, of a ball caster, also embodying the principles of the invention.

Fig. 9 is a fragmentary side view, partly in section, of an anti-friction strip for windows, desk drawers, and the like, also embodying the invention.

Referring now to the drawing in which like reference numerals denote corresponding parts throughout the several views, the numeral 10 indicates a flat flexible annular ball retainer ring or cage for a thrust bearing, said ring 10 being constructed of elastic slightly yieldable material, preferably fibre. It will be understood, however, that any other suitable material may be employed within the spirit of the invention, such as rubber, bakelite, steel, bronze, brass, die-cast metal, bearing metal, aluminum, etc. The ball retainer ring 10 has a plurality of transverse apertures or sockets 11 extending therethrough, said apertures having cylindrical upper and lower ends 12 and 13 respectively, and being provided with spherical intermediate portions 14 to loosely fit the balls 15, as clearly shown in Fig. 3, and provide a running fit. The spherical portions are machined out by a special solid non-expanding tool, not shown. The ball retainer or cage 10 is located between a pair of thrust plates 16 and 17, as shown in Fig. 1.

In order to detachably hold the balls 15 securely in the retainer 10, the upper and lower cylindrical openings 12 and 13 are made slightly smaller than the balls 15. For example, when using a ⅜ inch ball, the cylindrical openings for a fibre retainer were about .010 of an inch smaller than the balls, permitting the latter to be forcibly driven in from above or below, as by the blows of a hammer, as indicated by the dotted lines in Fig. 3. With a bronze retainer the opening would be .006 inch smaller, and with a steel retainer, .003 inch smaller. As will be understood, during the ball-inserting operation, the openings 12 and 13 of the sockets 11 will be compressed and will thereafter immediately expand to their original size so as to removably retain the balls in operating position. When it is desired to remove a ball from its socket, it will only be necessary to forcibly drive it out from above or below by means of a hammer or other tool.

In the modified form of the invention shown in Figs. 4 and 5, a radial bearing is illustrated including an inner collar 18 and an outer collar 19, between which the ball-holding retainer 20 is housed. The ball retainer 20 is constructed of the same flexible yieldable material as the ball retainer 10 of the first form of the invention. As most clearly shown in Fig. 5, the retainer 20 has a plurality of sockets opening radially on both the inner and outer sides thereof and also having small transverse cylindrical openings 21 at the top, and larger transverse cylindrical openings 22 at the bottom, said openings 22 being only slightly smaller than the diameter of the balls, so that they will yield under pressure to permit the balls to enter. It will be understood that after the balls have been driven into operating position, they will expand again to retain the balls securely in place exactly as in the first form of the invention. The balls may be readily forced out of or rejected from the retainer by the use of a small rod (not shown) which may be inserted through the small top openings 21 and subjected to the blows of a hammer.

In the modified form of the invention shown in Figs. 6 and 7, a second form of radial bearing is illustrated in which an inside collar 23 and an outside collar 24, forming tracks for the balls 25 are provided respectively with oppositely disposed short arcuate recesses 26 and 27 adapted to be brought into alinement with the position of the inner and outer edges of one of the balls 25. A flexible yieldable retaining ring 28 is provided having a continuous base portion 29 from which extend a plurality of upstanding jaws 30, the opposite faces of said jaws having spherical central sections 31 freely fitting the balls 25 and smaller cylindrical ball-retaining top sections 32. Provision is also made of suitably spaced punch-out holes 33 in the base portion 29 to permit the removal of the balls in the same manner as described above for the second form of the invention.

In the embodiment of the invention shown in Fig. 8, a ball caster is illustrated, comprising a hollow elastic body member 34 of substantially semi-spherical shape. The body member 34 has an inner spherical seat 35 for a ball 36, the mouth 37 of said member being just smaller than the diameter of the ball. A screw 38 is provided in the top of the body member 34 for attaching the caster to a furniture leg, not shown. As in the previous forms of the invention, the ball may be easily driven into its socket by the blows of a hammer.

In the embodiment of the invention shown in Fig. 9, a strip 39 of flexible yieldable material, such as fibre, is illustrated, said strip having a plurality of spherical sockets 40 forming seats for balls 41, said sockets having small punch-out holes 42 communicating with their upper portions, whereby the balls may be punched out by the use of small rods, not shown, as in the forms of the invention shown in Figs. 4–7. The mouth of each of the sockets 40 is slightly smaller than the diameter of the balls, whereby each ball must be forced into its socket by pressure, and will be removably retained therein as long as desired.

One advantage of the present invention is that by employing a ball retainer of flexible, yieldable material, no riveting, crimping, or upsetting operations are necessary. Hence, broken balls may be readily replaced.

While there have been disclosed in this specification several forms in which the invention may be embodied, it is to be understood that these forms are shown for the purpose of illustration only, and that the invention is not to be limited to the specific disclosures but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a ball-bearing retainer, a body of elastic yieldable non-metallic fibrous material, said body having a socket provided with a lateral circular opening normally smaller than the diameter of the ball which is adapted to be forcibly inserted through said opening and retained thereby.

2. In a ball-bearing retainer, a body of amorphous organic elastic yieldable material, said body having a socket provided with an opening normally smaller than the diameter of the ball which is adapted to be forcibly inserted through said opening and retained thereby.

3. In a ball-bearing retainer, a body of amorphous organic elastic yieldable material, said body having a socket provided with a lateral circular opening normally smaller than the diameter of the ball which is adapted to be forcibly inserted through said opening and retained thereby, said body having a punch-out opening opposite the ball-insertion opening through which a ball-ejecting tool may be inserted.

4. In a ball-bearing retainer, a body of solid amorphous elastic material having a plurality of hollow spherical sockets for housing a like number of balls, said sockets having lateral circular openings normally smaller than said balls, said balls being adapted to be forcibly inserted through said openings, the material around the entire edge of said openings being enlarged and compressed during the insertion of the balls and thereafter expanding to retain the balls securely in operating position.

5. In a ball retainer for a radial anti-friction bearing, an annular ring of elastic amorphous organic material, said ring comprising a continuous base with a plurality of laterally extending ball-holding jaws, the opposite faces of said jaws being spherical, the edges of adjacent jaws lying in a circle having a diameter slightly less than the diameter of said balls, whereby said balls may be forcibly inserted into position between said jaws and removably retained thereby.

6. In a ball retainer for a radial anti-friction bearing, an annular ring of amorphous organic elastic material, said ring comprising a continuous base with a plurality of laterally extending ball-holding jaws, the opposite faces of said jaws being spherical, the edges of adjacent jaws lying in a circle having a diameter slightly less than the diameter of said balls, whereby said balls may be forcibly inserted into position between said jaws and removably retained thereby, said base having a plurality of punch-out openings arranged in alinement with the position of the balls.

7. In a radial ball-bearing, an inner ball-engaging ring, an outer ball-engaging ring, a ball-retaining cage of highly elastic compressible amorphous material located between said rings, said inner ring having an arcuate recess on its outer periphery adapted to be brought into alinement with an arcuate recess on the inner periphery of said outer ring, said cage having a pair of flexible laterally projecting ball-holding jaws extending only partly around the periphery of said ball, said jaws being forcibly separable to permit the ball to be inserted laterally therebetween when the arcuate recesses are in alinement with said ball.

8. In a radial ball-bearing, an inner ball-engaging ring, an outer ball-engaging ring, a ball-retaining cage of elastic fibrous material located between said rings, said inner ring having an arcuate recess on its outer periphery, said cage having a pair of flexible ball-holding jaws extending only partly around the periphery of said ball, said jaws being forcibly separated to permit the ball to be inserted therebetween when the arcuate recess is in alinement with said ball.

9. In a radial ball-bearing, an inner ball-engaging ring, an outer ball-engaging ring, a ball retaining cage of elastic fibrous material located between said rings, said outer ring having an arcuate recess on its inner periphery, said cage having a pair of flexible ball-holding jaws extending only partly around the periphery of said ball, said jaws being forcibly separated to permit the ball to be inserted therebetween when the arcuate recesses are in alinement with said ball.

In testimony whereof, I have affixed my signature to this specification.

FREDERICK CHARLES YATES.